United States Patent
Kowalczyk et al.

(10) Patent No.: US 8,774,585 B2
(45) Date of Patent: Jul. 8, 2014

(54) STRAIN-RELIEF BRACKET FOR FIBER OPTIC CLOSURE

(75) Inventors: Scott C. Kowalczyk, Savage, MN (US); Paula Rudenick, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 97 days.

(21) Appl. No.: 13/444,528

(22) Filed: Apr. 11, 2012

(65) Prior Publication Data

US 2012/0263425 A1    Oct. 18, 2012

Related U.S. Application Data

(60) Provisional application No. 61/474,500, filed on Apr. 12, 2011.

(51) Int. Cl.
*G02B 6/00*    (2006.01)

(52) U.S. Cl.
USPC .......................................... 385/135; 385/134

(58) Field of Classification Search
USPC .................... 385/134, 104, 105, 135; 211/26; 439/404

See application file for complete search history.

(56) References Cited

U.S. PATENT DOCUMENTS

| | | | |
|---|---|---|---|
| 4,679,880 A * | 7/1987 | Pitsch ............................ | 439/404 |
| 5,278,933 A | 1/1994 | Hunsinger et al. | |
| 5,323,480 A | 6/1994 | Mullaney et al. | |
| 5,479,553 A | 12/1995 | Daems et al. | |
| 6,307,997 B1 | 10/2001 | Walters et al. | |
| 6,504,986 B1 | 1/2003 | Wambeke et al. | |
| 6,507,691 B1 | 1/2003 | Hunsinger et al. | |
| 6,539,160 B2 | 3/2003 | Battey et al. | |
| 6,542,674 B1 | 4/2003 | Gimblet | |
| 6,614,665 B2 | 9/2003 | Witty et al. | |
| 7,013,074 B2 | 3/2006 | Battey et al. | |
| 7,120,347 B2 | 10/2006 | Blackwell, Jr. et al. | |
| 7,499,622 B2 | 3/2009 | Castonguay et al. | |
| 7,603,018 B2 | 10/2009 | Mullaney et al. | |
| 7,711,236 B2 | 5/2010 | Gonzalez et al. | |
| 7,780,173 B2 | 8/2010 | Mullaney et al. | |
| 7,802,926 B2 | 9/2010 | Leeman et al. | |
| 7,941,027 B2 | 5/2011 | Mertesdorf et al. | |
| 7,970,249 B2 | 6/2011 | Solheid et al. | |
| 8,224,145 B2 | 7/2012 | Reagan et al. | |
| 2006/0091086 A1 * | 5/2006 | Canty et al. ..................... | 211/26 |
| 2009/0060439 A1 | 3/2009 | Cox et al. | |
| 2009/0324182 A1 | 12/2009 | Kachmar et al. | |
| 2010/0209050 A1 | 8/2010 | Vastmans et al. | |
| 2010/0272408 A1 | 10/2010 | Vastmans et al. | |
| 2010/0284661 A1 | 11/2010 | Bran de Leon et al. | |
| 2012/0322310 A1 | 12/2012 | Taylor | |

OTHER PUBLICATIONS

Tyco Electronics, "Fiber Closures and Terminals" http://us.telecomosp.com/fiber%20optic%20products/fiber%20closures/default.htm, (2010), pp. 1-3.
Tyco Electronics, "FOSC 400, Fiber Optic Splice Closure" (1999), pp. 1-4.
Tyco Electronics, "FOSC-450, Fiber Optic Gel Closure" (2009), pp. 1-2.
Tyco Electronics, "OFDC-B8, Outdoor Fiber Distribution Closure" (2010), 1 page.
Tyco Electronics, "Kit Content" (2010) 1 page.

* cited by examiner

*Primary Examiner* — Ellen Kim
(74) *Attorney, Agent, or Firm* — Merchant & Gould P.C.

(57) ABSTRACT

A fiber optic closure includes optical adapters located within an enclosure, a ledge located within the enclosure between the optical adapters and a cable port, and a strain-relief bracket located within the enclosure at the ledge. The strain-relief bracket defines channels that align with channels defined in the ledge. Each of the channels of the strain-relief bracket is narrower than a fiber optic connector that is suitable to be plugged into one of the optical adapters. The strain-relief bracket provides support ledges between the channels that inhibit fiber optic connectors from being pulled out of the optical adapters.

24 Claims, 15 Drawing Sheets

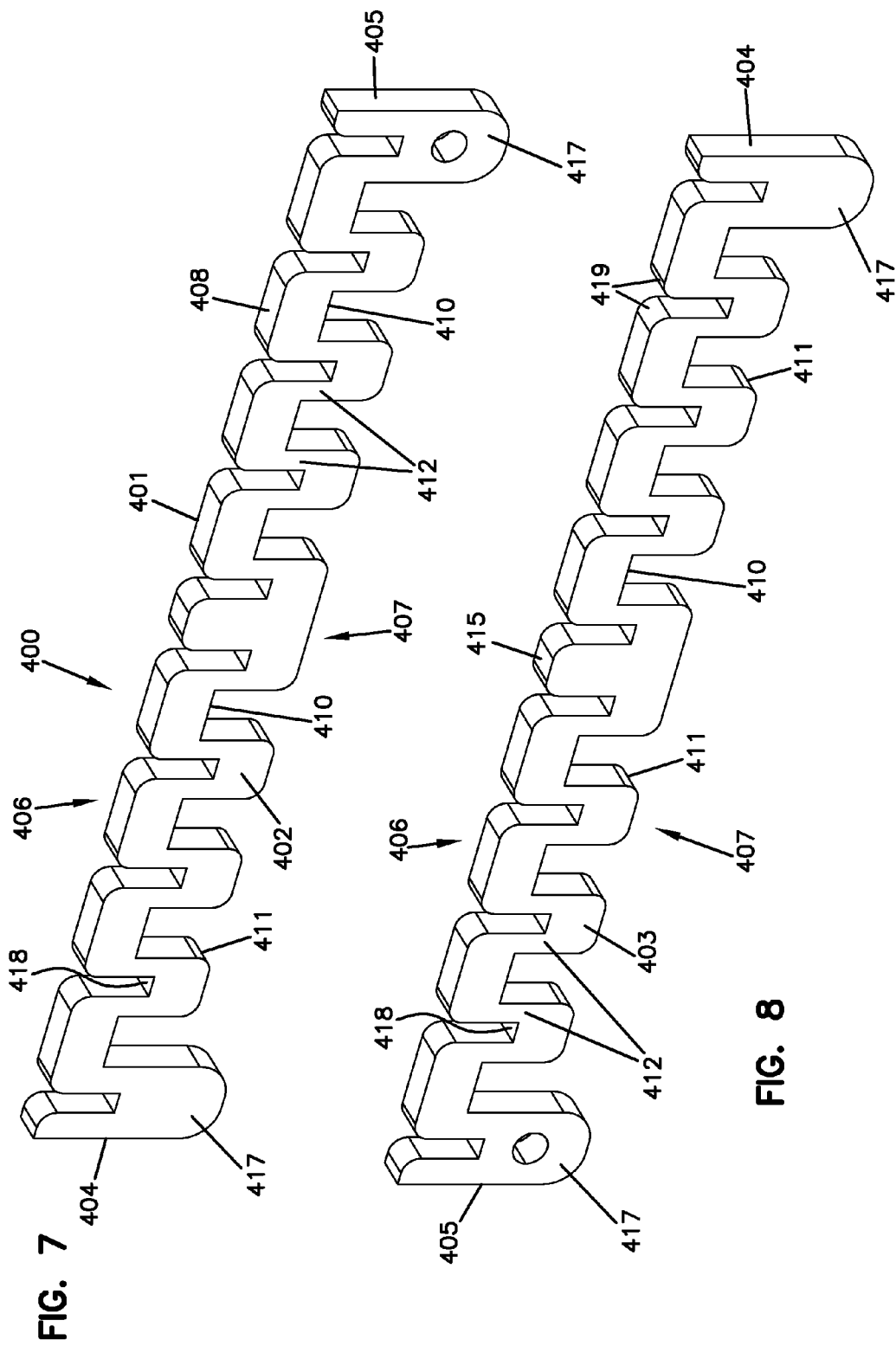

STRAIN-RELIEF BRACKET FOR FIBER OPTIC CLOSURE

CROSS-REFERENCE TO RELATED APPLICATION

The present application claims the benefit of U.S. Provisional Patent Application Ser. No. 61/474,500, filed Apr. 12, 2011, which application is hereby incorporated by reference in its entirety.

TECHNICAL FIELD

This disclosure relates to strain relief for connectorized optical fiber cables. In particular, this disclosure relates to a strain-relief bracket that is suitable to provide strain-relief to fiber optic connectors plugged into optical adapters within fiber optic closures (e.g., drop boxes, fiber distribution hubs, etc.).

BACKGROUND

Fiber optic communication systems are becoming prevalent in part because service providers want to deliver high band width communication capabilities to customers. Fiber optic communication systems employ a network of fiber optic cables to transmit large volumes of data and voice signals over relatively long distances. A typical fiber optic network includes a system of fiber optic cables that interconnect a plurality of subscribers (also known as end users or customers) to a central location such as a central office. The system of fiber optic cables can include architecture that transitions from higher fiber count fiber optic cables (e.g., distribution cables, trunk cables, main cables, F1 cables, etc.) to lower fiber count fiber optic cables. The smallest fiber count cables (e.g., drop cables) are typically nearest to the subscribers. Enclosures (e.g., drop terminals, splice closures, optical network terminals, pedestals, aerial enclosures, etc.) are provided throughout the network for providing connection locations for interconnecting higher fiber count fiber optic cables to lower fiber count fiber optic cables.

FIG. 1 shows an example fiber optic network 100 that interconnects a central office 101 to a number of subscribers 105 (i.e., end users or customers). The central office can additionally connect to one or more larger networks, such as the Internet (not shown) and a public switched telephone network (PSTN).

Some cables in the network 100 can be branched out from main cable lines 120 and routed to fiber distribution and access terminals (e.g., fiber distribution hubs (FDHs) or pedestals). For example, feeder cables can branch from main cable lines 120 at branch points 102 and be routed to FDHs 103. Such branched cables might extend from the FDHs 103 to smaller fiber access terminals (e.g., optical network terminals or drop terminals) 104 directly adjacent the subscribers 105 (e.g., business or home) to which service may be provided. The various lines of the network can be aerial or housed within underground conduits. In other implementations, the cable lines 120 can be routed through enclosures/terminals where selected optical fibers of the cable lines 120 are accessed for connection to drop lines.

As demand for telecommunications increases, fiber optic networks are being extended in more and more areas. In facilities such as multiple dwelling units, apartments, condominiums, businesses, etc., fiber access terminals 104 or other fiber optic enclosures are used to provide subscriber access points for the end users 105.

Improvements to current fiber networks are desirable.

SUMMARY

Certain aspects of the disclosure relate to fiber access terminals (e.g., optical network terminals or drop terminals). Each fiber access terminal includes an enclosure that is adapted to optically connect incoming fibers to outgoing fibers. Certain aspects of the disclosure relate to features that facilitate strain-relief within the enclosures.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIGS. 7-9 are top perspective views of an example implementation of a strain-relief bracket in accordance with the principles of the disclosure;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
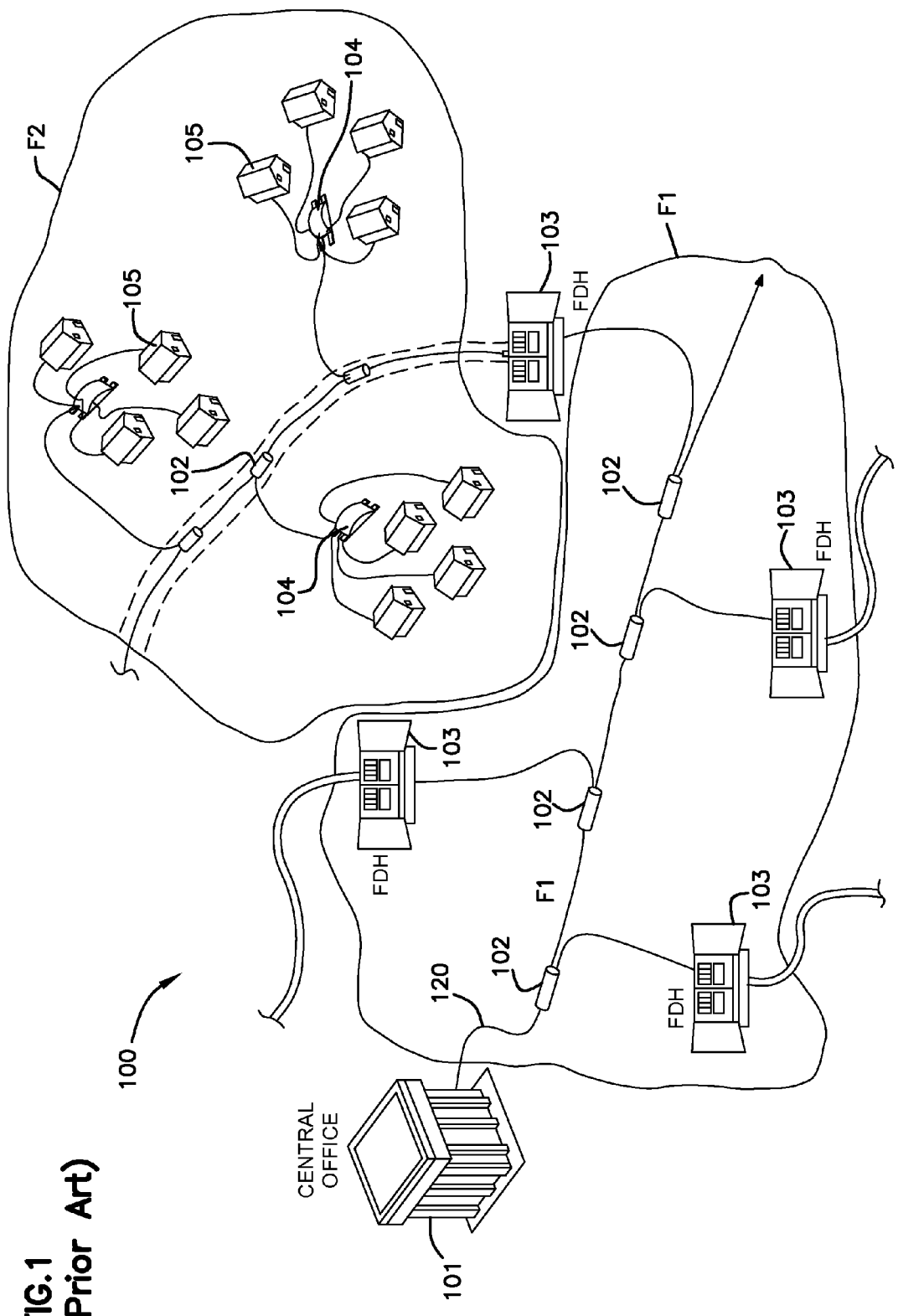
FIG. 1 illustrates a network deploying passive fiber optic lines and including a central office that connects a number of end subscribers (also called end users herein) in a network in accordance with the principles of the present disclosure.
Figure 2:
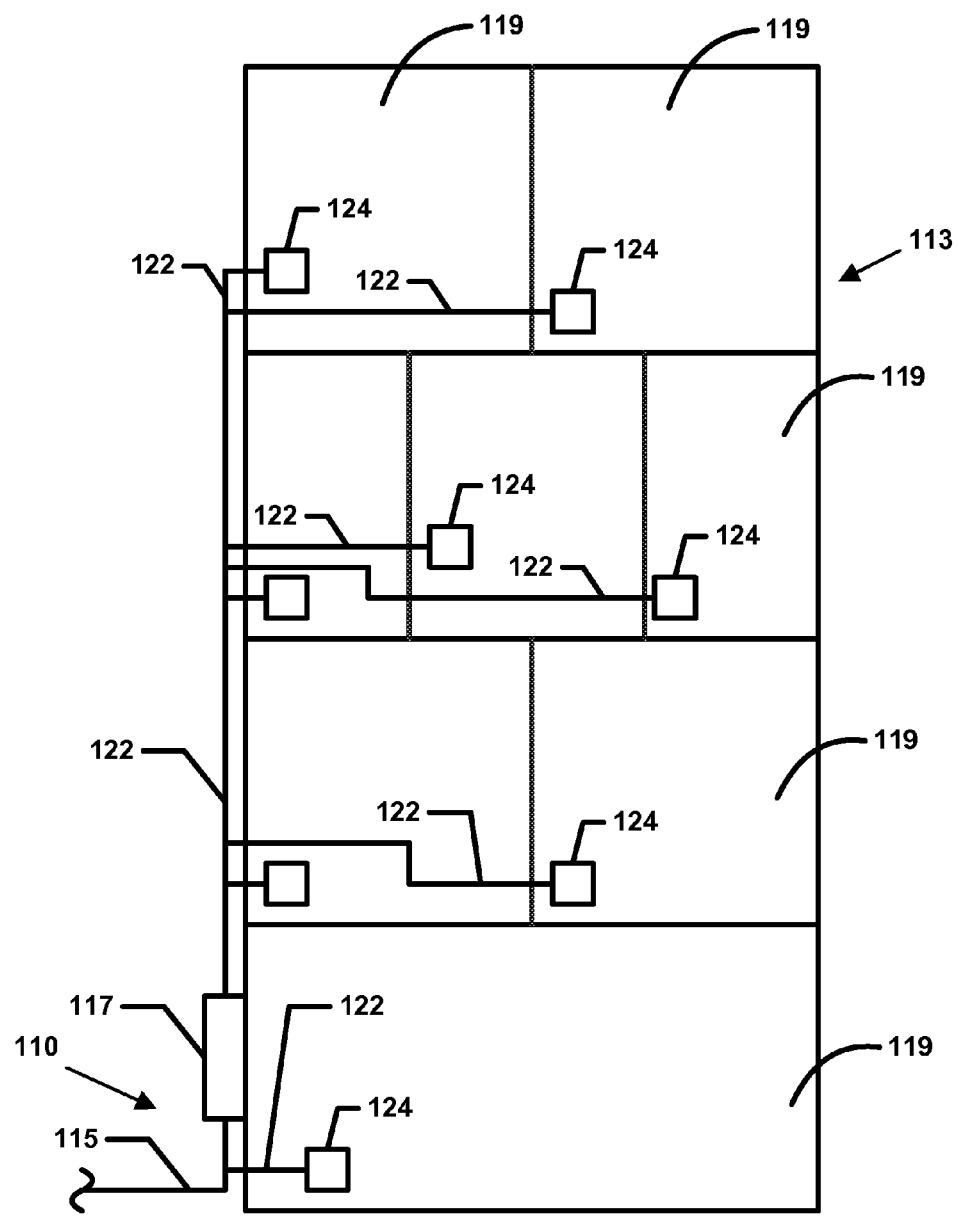
FIG. 2 is a schematic representation of a portion of the fiber optic network of FIG. 1 including an access terminal enclosure having features that are examples of inventive aspects in accordance with the principles of the present disclosure.

FIG. 2 is a schematic representation of an example portion 110 of a fiber optic network, such as fiber optic network 100 of FIG. 1, configured in accordance with the principles of the present disclosure. The illustrated network portion 110 includes a facility 113 (e.g., an individual residence, an apartment, a condominium, a business, etc.) at which at least one fiber optic enclosure 117 is located. The network portion 110 also includes a feeder cable 115, which includes one or more fibers branched off from a main cable line, routed to the fiber optic enclosure 117.

The feeder cable 115 enters a fiber optic enclosure 117 (e.g., a fiber access terminal, a fiber distribution hub, a network interface device, etc.) having a plurality of fiber optic adapters that connect the feeder cable 115 to one or more subscriber cables (e.g., drop cables) 122. In some implementations, the fiber optic enclosure 117 also includes one or more optical splitters (e.g., 1-to-8 splitters, 1-to-16 splitters, or 1-to-32 splitters) that split signals carried over feeder cable fibers onto multiple subscriber cable fibers.

By way of example only, the fiber optic enclosure 117 may be located on an external wall of the facility 113. In other example implementations, the fiber optic enclosure 117 may be located inside the facility 113 (e.g., in a lower level or basement). One or more units 119 in the facility 13 include an end location 124 (e.g., a wall outlet, network interface device, or other user connection terminal) to which one of the subscriber cables 122 is routed.

Figure 3:
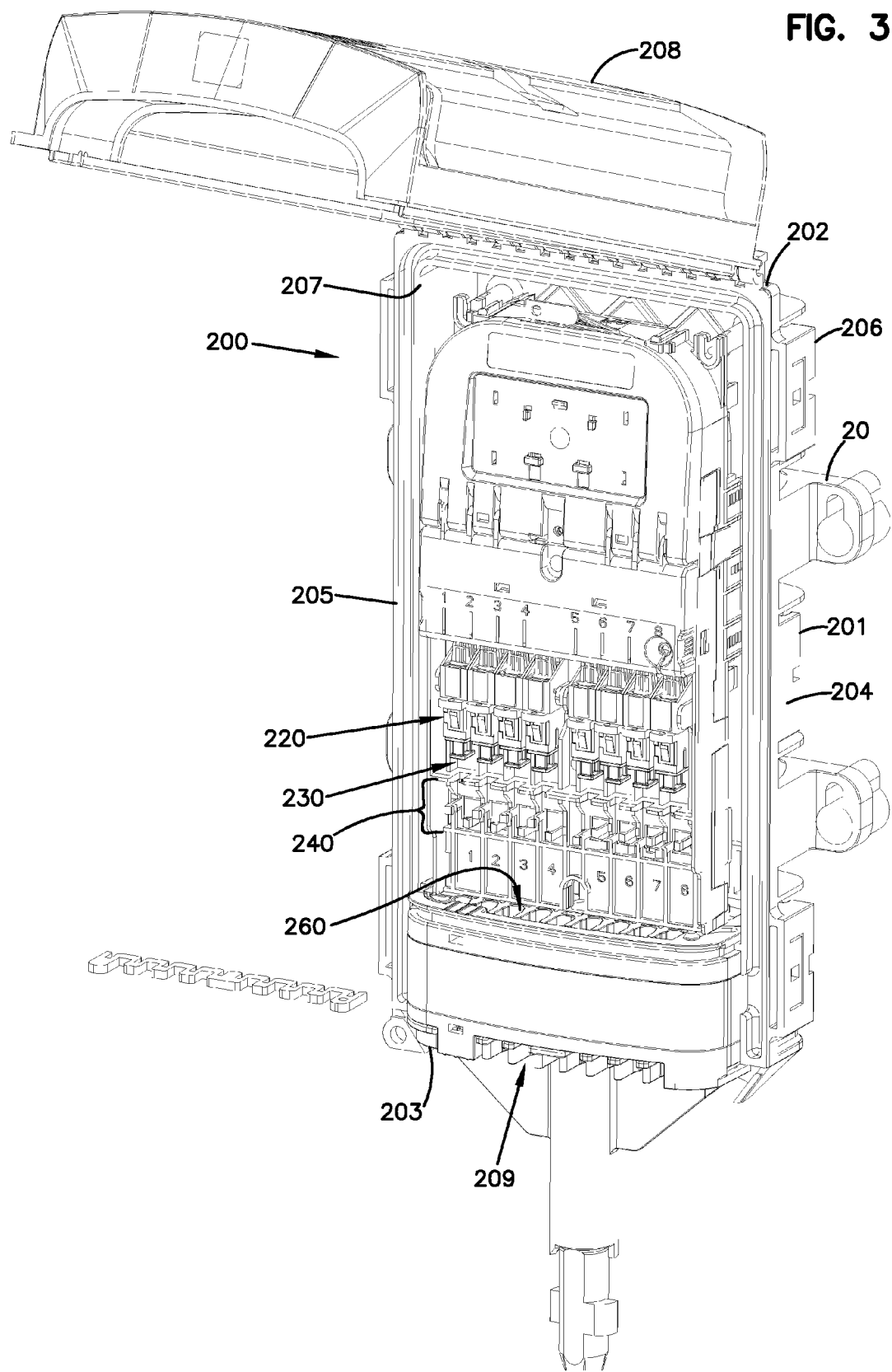
FIG. 3 is a perspective view of one example implementation of a fiber optic enclosure configured to provide a connection interface between two or more optical fibers.

FIG. 3 is a perspective view of one example implementation of a fiber optic enclosure 200 configured to provide a connection interface between two or more optical fibers. The enclosure 200 includes a base 201 having a top 202, a bottom 203, a first side 204, a second side 205, a rear 206, and an open front 207. The enclosure 200 also may include a cover 208. Together, the base 201 and the cover 208 define an interior of the enclosure 200. The base and cover each may have a thickness within the range from about 0.02 inches (0.5 mm) to about 0.16 inches (4 mm).

The cover 208 is pivotally mounted to the base 201 to provide selective access to the interior of the enclosure 200. For example, the cover 208 couples to the base 201 at a hinge axis. In certain implementations, the hinge axis is located at the open front of the base 201. In the example shown, the hinge axis of the cover 208 extends along the top 202 of the base 201. In other implementations, however, the hinge axis of the cover 208 may extend along the first side 204 of the base 201, the second side 205 of the base 201, or the bottom 203 of the base 201.

The base 201 includes mounting members 203 defining openings that enable fasteners to secure the base 201 to a surface (e.g., a wall, a panel, etc.). For example, each mounting member 203 may define a through-opening. In the example shown, the base 201 includes two mounting members 203 extending from each side 204, 205 of the base 201. In other implementations, however, the base 201 may include greater or fewer mounting members 203. In still other implementations, the enclosure 200 includes other securement features to fix the enclosure 200 at a desired location.

The base 201 defines at least one cable port 209 leading to the interior of the enclosure 200. Certain types of enclosures 200 have multiple cable ports 209 leading to the interior. Each cable port 209 is configured to receive one or more optical cables. A termination location 220 is defined within the interior of the enclosure 200. In some implementations, the enclosure 200 is configured to receive at least a first feeder cable 115 and at least a first subscriber cable 122 that interface to each other at the termination location 220. Certain types of enclosures 200 are configured to receive a plurality of subscriber cables 122 that route to the termination location 220.

For example, certain types of enclosures 200 may define one or more feeder cable ports and one or more separate subscriber cable ports.

In some implementations, a gasket 260 may be provided at the cable ports 209 to seal the interior of the enclosure 200 from an exterior of the enclosure 200. For example, the gasket 260 may inhibit egress of environmental contamination (e.g., dirt, dust, water, rodents, etc.). Accordingly, the gasket 260 protects the exposed sections of the optical fibers 322 or inner assembly cables 320 from environmental contaminants. In some implementations, the gasket 260 defines one or more channels through which cables, such as fiber optic cables 300, may be routed. In certain implementations, a single fiber optic cable 300 is routed through each channel of the gasket 260. Certain types of gaskets 260 include elastomeric membranes that expand radially inwardly to sealingly compress along a length of the fiber optic cables 300 when the gasket 260 is axially compressed.

As the term is used herein, an "optical cable" refers to a physical medium that is capable of carrying one or more optical signals along its length. For example, an optical cable may include one or more optical fibers that are configured to carry optical signals along their length. The fibers in a fiber optic cable may be buffered and/or jacketed (e.g., individually or as a group). Certain types of fiber optic cables may be terminated with one or more connectors (e.g., SC, LC, FC, LX.5, or MPO connectors).

Figure 5:
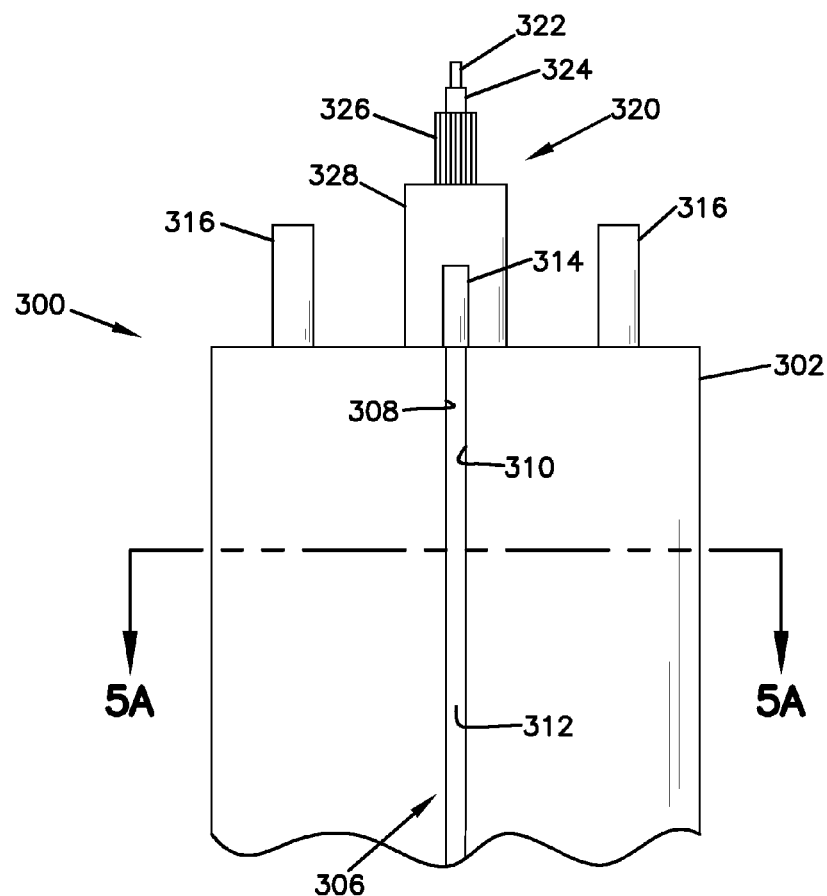
FIGS. 5 and 5A show one example implementation of a fiber optic cable assembly including one or more optical fibers suitable for use in the fiber optic enclosure disclosed herein.
Figure 5A:
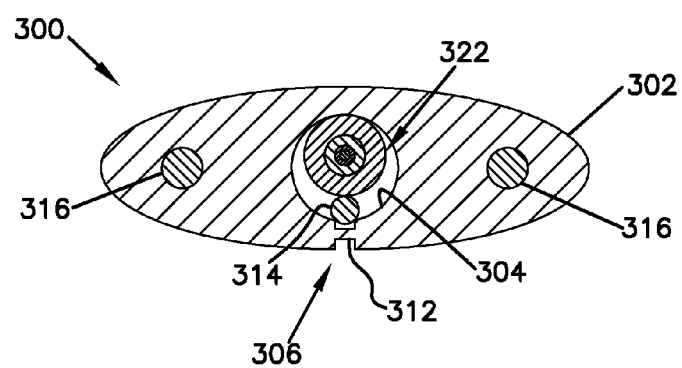

FIGS. 5 and 5A show one example implementation of a fiber optic cable assembly, generally designated 300, including one or more optical fibers 322 suitable for use in the fiber optic enclosure 200 disclosed herein. The fiber optic drop cable assembly 300 includes an inner cable assembly 320. The inner cable assembly 320 includes one or more optical fibers 322, a buffer layer 324, a first strength layer 326, and a first jacket 328 (see FIG. 5).

Certain types of fiber optic cable assemblies 300 are suitable for outside use. For example, the cable assembly 300 may be a hardened/ruggedized cable assembly. In some implementations, certain types of fiber optic cable assemblies 300 further includes a second jacket 302 disposed about the inner cable assembly 320. In the example shown, the fiber optic drop cable assembly 300 is a generally flat cable assembly. For example, a width of the second jacket 302 is greater than a thickness of the second jacket 302. It will be understood, however, that the scope of the present disclosure is not limited to the fiber optic cable assembly 300 being a generally flat cable assembly.

The second jacket 302 defines a cable opening 304 that extends the length of the fiber optic cable assembly 300. The cable opening 304 is sized to receive at least the inner cable assembly 320. At least a portion of the second jacket 302 of the fiber optic drop cable assembly 300 can be selectively removed to expose the inner cable assembly 320. The second jacket 302 further defines a longitudinal split, generally designated 306. In one implementation, the longitudinal split 306 extends the length of the fiber optic drop cable assembly 300. The longitudinal split 306 includes a first longitudinal end 308 and an oppositely disposed second longitudinal end 310.

In certain implementations, a web 312 connects the first and second longitudinal ends 308, 310 of the longitudinal split 306. The web 312 acts as a line of weakness at which the second jacket 302 can be selectively opened. The web 312 is a thin strip of material having a thickness that is less than a thickness of the second jacket 302 between an outer surface of the second jacket 302 and the cable opening 304. In the example shown, the web 312 is made of the same material as the second jacket 302.

In some implementations, a ripcord 314 is disposed in the cable opening 304 between the first jacket 20 of the inner cable assembly 320 and the second jacket 302. The ripcord 314 extends the length of the fiber optic drop cable assembly 300. In the subject embodiment, the ripcord 314 is adapted to tear through the web 312 when subjected to a pulling force in a direction that is radially outward from the inner cable assembly 320. As the ripcord 314 is pulled, the first and second longitudinal ends 308, 310 of the longitudinal split 306 separate, thereby providing a location at which the inner cable assembly 320 can be removed from the second jacket 302. In one implementations, the ripcord 314 is a polyester material. In another embodiment, the ripcord 314 is a nylon material. In another embodiment, the ripcord 314 is coated KEVLAR®.

At least the second jacket 302 of the fiber optic cable assembly 300 is removed from a section of the optical fiber 322 extending within the enclosure 200. In some implementations, the jacket 328 and/or buffer tube 324 also may be stripped from the optical fibers 322 routed within the enclosure 200. In certain implementations, the optical fibers 322 may be upjacketed at one or more cable fanouts. In other implementations, one or more fibers of the inner cable assembly 320 are preterminated with fiber optic connectors 340 at a factory or other manufacturing facility.

Additional details pertaining to the fiber optic cable assembly 300 can be found in U.S. Publication No. 2009-0324182 A1, filed May 27, 2009 as U.S. application Ser. No. 12/472,587, and titled "Multi-Jacketed Fiber Optic Cable," the disclosure of which is hereby incorporated herein by reference. In other implementations, the fiber optic cable assembly 300 includes only the inner cable assembly 320. In still other implementations, the fiber optic cable assembly 300 may include any desired configuration of optical fibers 322.

Figure 6:
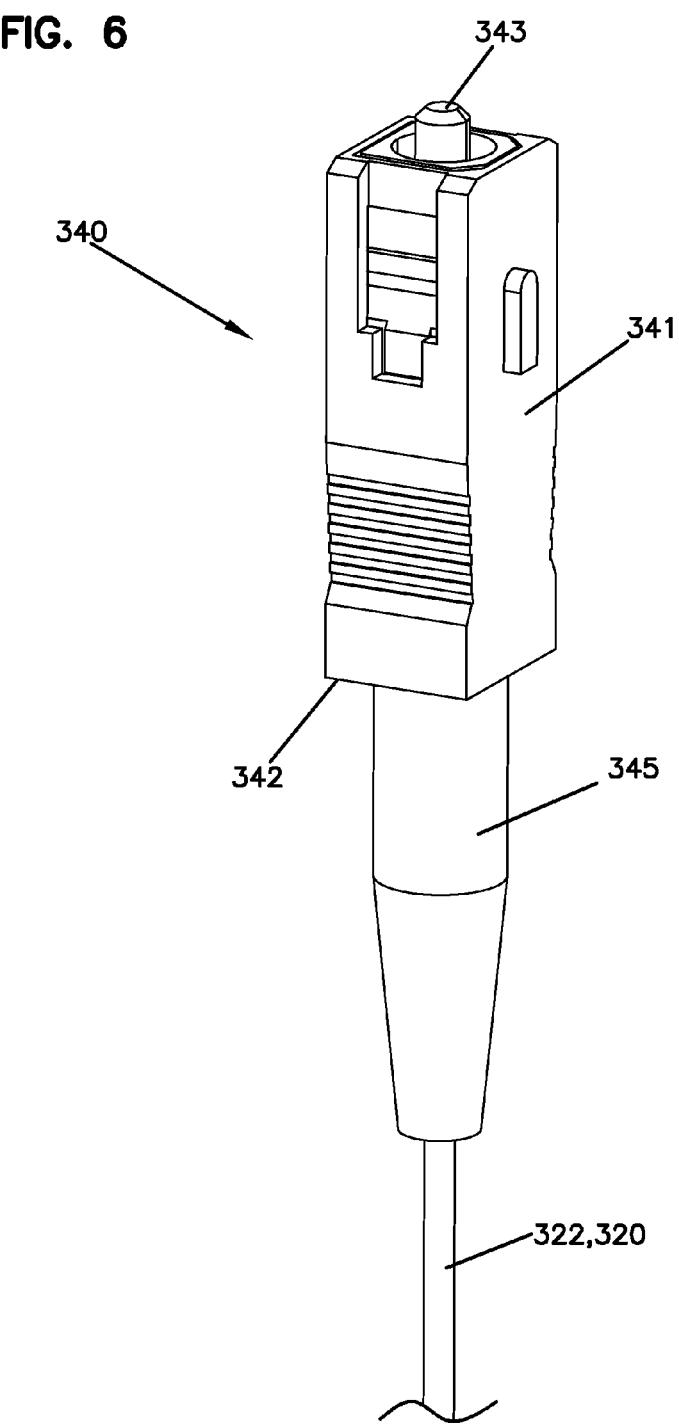
FIGS. 6, 6A, and 6B show various views of an example fiber optic connector terminating one end of an optical cable.
Figure 6A:
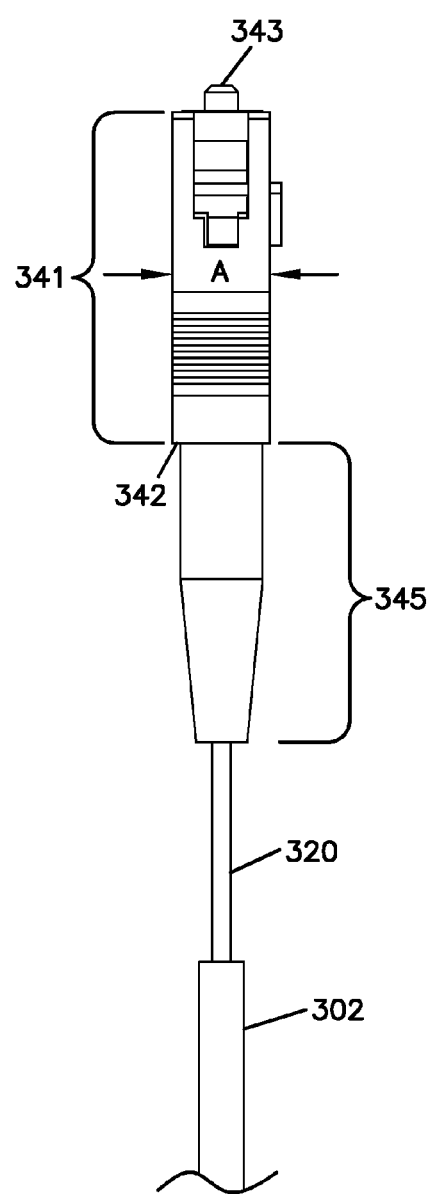
Figure 6B:
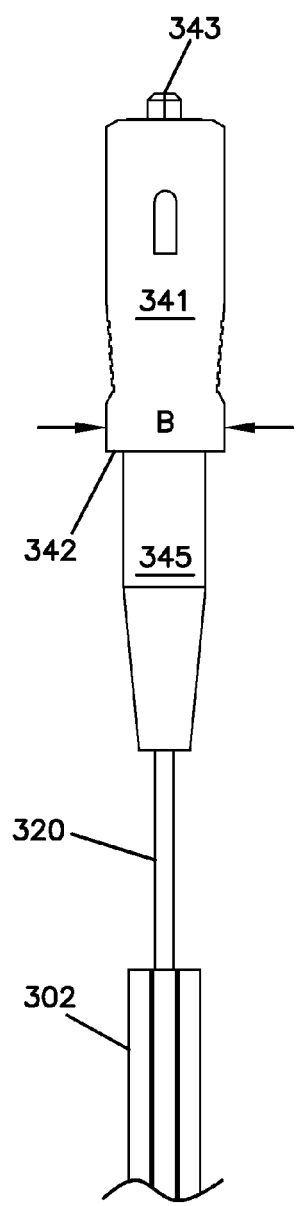
Figure 9:
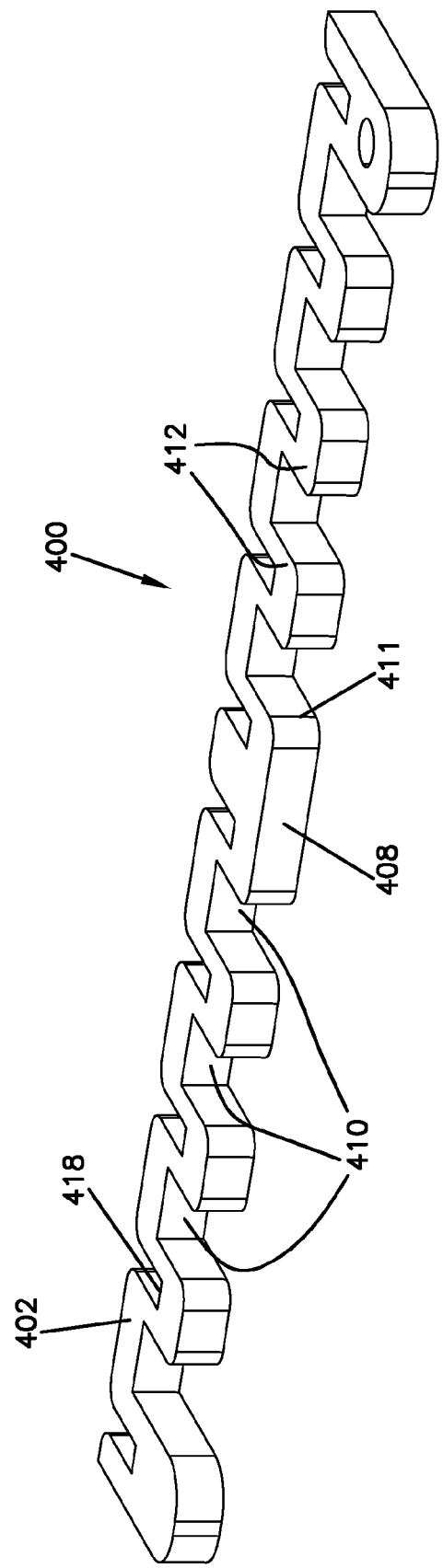
Figure 11:
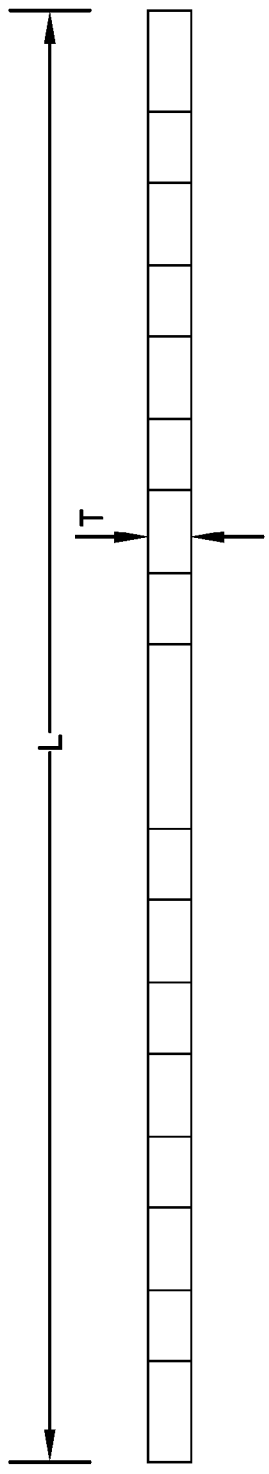
FIG. 11 is a side elevational view of the example strain-relief bracket of FIG. 10.
Figure 10:
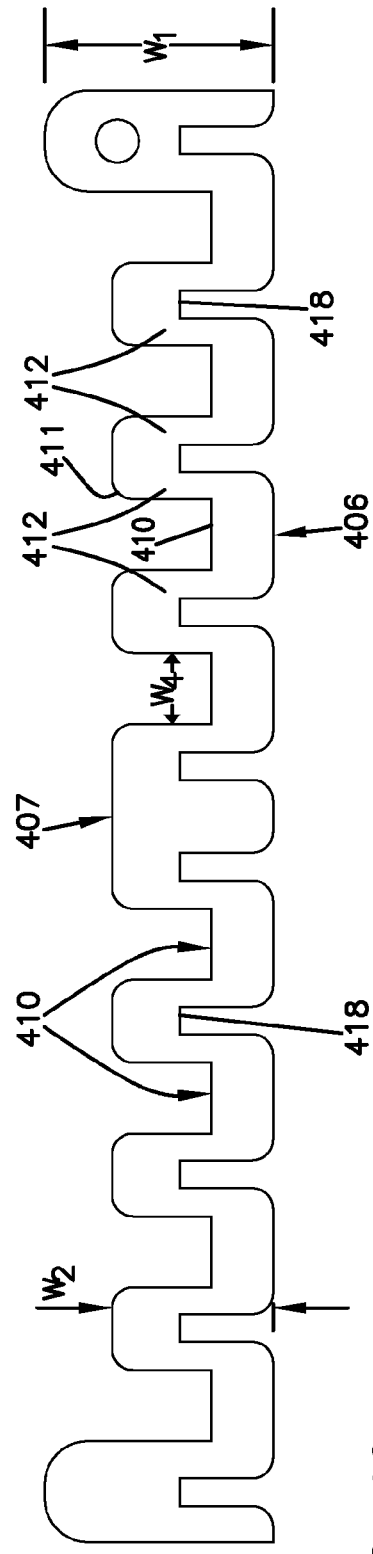
FIG. 10 is a plan view of the example strain-relief bracket of FIGS. 7-9.

FIGS. 6, 6A, and 6B show various views of a fiber optic connector 340 terminating one end of an optical cable, such as fiber optic cable 300. The fiber optic connector 340 has a connector body 341 holding a ferrule 343. The ferrule 343 retains the optical fiber 322 of the cable 300. The connector body 341 has an end surface 342 at an opposite side from the ferrule 343. In the example shown, the connector body 341 defines an SC-type fiber optic connector body. In other implementations, however, the connector body 341 may define an LC-type fiber optic connector body, an ST-type fiber optic connector body, and LX.5 type fiber optic connector body, or any other type of connector body.

The connector body 341 has a height A (FIG. 6A) and a width B (FIG. 6B). In some implementations, the height A of the connector body 341 ranges between about 0.275 inches (about 7 mm) and about 0.3 inches (about 7.5 mm). In one example implementation, the height A of the connector body 341 is about 0.28 inches (about 7.2 mm). In another example implementation, the height A of the connector body 341 is about 0.29 inches (about 7.4 mm). In some implementations, the width B of the connector body 341 ranges between about 0.33 inches (about 8.5 mm) and about 0.36 inches (about 9.2 mm). In one example implementation, the width B of the connector body 341 is about 0.346 inches (about 8.8 mm). In another example implementation, the width B of the connector body 341 is about 0.354 inches (about 9 mm).

A boot 345 extends from the end surface 342 of the connector body 341. The boot 345 inhibits bending of the optical fiber 322 beyond a bend radius limit. The boot 345 includes a first portion having a relatively constant diameter and a second portion that tapers inwardly as the boot 345 extends away from the connector body 341. In some implementations, the boot 345 is generally smooth. In other implementations, the boot 345 defines one or more notches or ridges that facilitate bending of the boot 345. In certain implementations, the boot 345 is made of a relative soft, deformable material.

Figure 4:
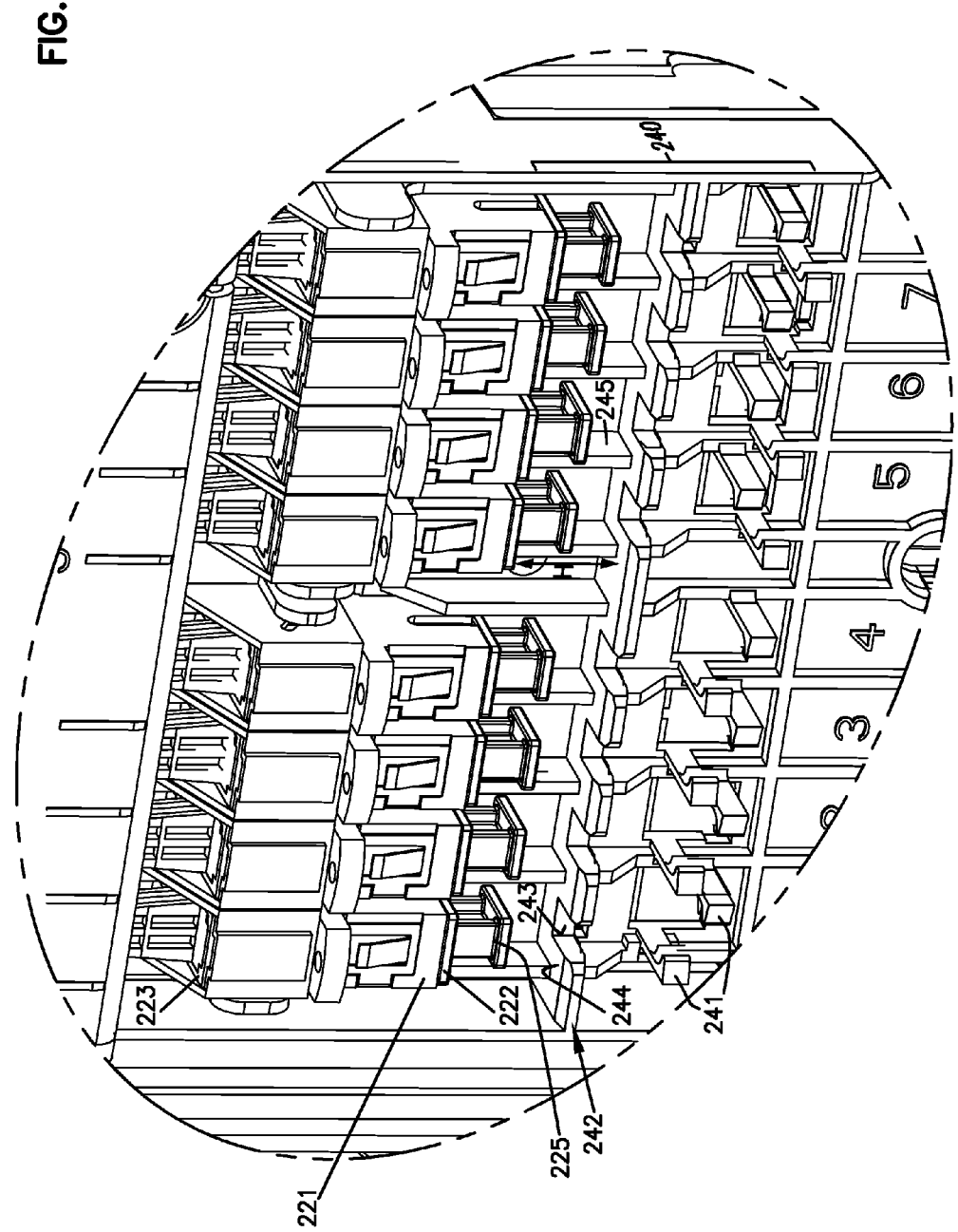
FIG. 4 is an enlarged view of a portion of FIG. 3.

Referring back to FIGS. 3 and 4, one or more connectorized optical fibers 322 extend from the gasket 260 or cable ports 209 to the termination location 220. As noted above, the optical fibers 322 may be bare, buffered, jacketed, upjacketed, or hardened/ruggedized). In the example shown in FIGS. 14-16, the full cable 300 extends through one of the channels defined in the gasket 260 into the enclosure 200. Accordingly, the gasket 260 forms a seal around the ruggedized outer jacket 302 of the cable 300.

The outer jacket 302 is stripped from at least the inner cable assembly 320 at a point between the gasket 260 and the cable management location 240. In various implementations, the outer jacket 302, the first jacket 328, the buffer layer 324, strength members 326, or some combination thereof are stripped from the optical fibers 322. The connectorized end of the inner cable assembly 320 (or of the optical fibers 322 or some portion thereof) extends through the management section 240 to the termination location 220.

One or more optical adapters 221 are positioned at the termination location 220. In some implementations, the optical adapters 221 form a single row extending between the first and second sides 204, 205 of the enclosure 200. In other implementations, the optical adapters 221 may form multiple rows or may form one or more columns at the termination location 220. Each of the optical adapters has a first port 222 facing the cable ports 209 of the enclosure 200 and a second port 223 facing away from the cable ports 209. Each of the first and second ports 222, 223 of the optical adapters 221 is sized and configured to receive a fiber optic connector 340 (see FIG. 6) terminating at least one of the optical fiber 322. The interior of each optical adapter 220 is configured to align ferrules of the fiber optic connectors 340 received at the ports 222, 223.

In some implementations, the optical adapters 221 are configured to pivot or rotate to face at least the first ports 222 away from the base 201 of the enclosure (e.g., towards a user). Pivoting the optical adapters 221 towards the user facilitates plugging the fiber optic connectors 340 into the first ports 222 of the optical adapters 221. As will be discussed in more detail herein, pivoting the optical adapters 221 also may facilitate plugging the fiber optic connectors 340 into the first ports 222 of the optical adapters 221 without removing the strain-relief bracket 400 from the enclosure 200.

Additional details pertaining to one example implementation of pivoting optical adapters can be found, e.g., in U.S. Pat. No. 7,802,926, filed Oct. 2, 2006 as U.S. application Ser. No. 12/088,101, and titled "Optical Fibre Connection Device," the disclosure of which is hereby incorporated herein by reference.

In some implementations, at least some connectorized optical fibers are routed from the gasket 260 towards the second ports 223. For example, the connectorized optical fiber may be routed around one or more cable spools, bend radius limiters, or other management structures located within the enclosure 200. In other implementations, unconnectorized optical fibers may be routed to a splice tray located within the enclosure 200 to be spliced to connectorized optical fibers. In still other implementations, connectorized or unconnectorized optical fibers may be routed to one or more optical splitters located within the enclosure 200.

In some implementations, connectorized optical fibers are routed from the gasket 260 towards the first ports 222 of the optical adapters 221. In other implementations, optical fibers may be routed from the gasket 260 to a splice location or splitter location at which the optical fiber is optically coupled to a connectorized optical fiber. In the example shown, dust caps 225 are plugged into the first ports 222 of the optical adapters 221 to inhibit contamination of the optical adapters 221 until fiber optic connector 340 are received thereat.

A cable management section 240 is located within the interior of the enclosure 200 between the termination assembly 220 and the cable ports 209. The cable management section 240 is configured to manage and/or organize the optical fibers routed between the cable ports 209 and the termination assembly 220. In some implementations, the cable management section 240 provides separate routing paths for each optical fiber. In certain implementations, the management section 240 may include feature that aid in retaining and/or aligning the fiber optic connectors plugged into the optical adapters 221.

In some implementations, the cable management section 240 includes one or more retention fingers 241. In certain implementations, a pair of opposing retention fingers 241 cooperates to define a channel leading towards the first ports 222 of the optical adapters 221. In the example shown, each pair of retention fingers 241 includes a finger retention finger 241 that is offset from a second retention finger 241. In other implementations, the retention fingers 241 may be aligned in a plane.

A ledge 242 also is located at the cable management section 240 of the enclosure 200. The ledge 242, which is spaced a distance H (FIG. 4) from the optical adapters 241, defines one or more channels 243 that align with the first ports 242 of the optical adapters 221. In certain implementations, the channels 243 of the ledge 242 generally align with the channels defined by the retention fingers 241. In some implementations, the ledge 242 also defines a generally planar surface 244 facing the optical adapters 221.

Ribs 245 extend from the ledge 242 towards the adapters 221 generally parallel with insertion axes of the first ports 222 of the optical adapters 221. In the example shown, a rib 245 extends between adjacent first ports 222 of the optical adapters 221. In some implementations, the ribs 245 aid in aligning the fiber optic connectors 340 with the first ports 222 of the optical adapters 221. In certain implementations, the ribs 245 extend below the ledge 242 towards the cable ports 209.

A strain relief location 230 is defined within the interior of the enclosure to fix one or more of the fiber optic connectors 340 to the first ports 222 of the optical adapters 221 at the termination location 220. For example, a strain relief bracket 400 may be mounted at the strain relief location 230 to inhibit any fiber optic connectors 340 plugged into the first ports 222 of the optical adapters 221 from being pulled out unintentionally. Accordingly, the strain-relief bracket 400 reduces the risk of signal disruption, resulting in a more reliable connection.

FIGS. 7-11 illustrate one example implementation of a strain-relief bracket 400 suitable for use in the enclosure 200. The strain-relief bracket 400 includes a monolithic body 401 having first and second planar surfaces 402, 403, respectively, extending along a length L (FIG. 11) of the body 401 from a first end 404 to a second end 405. The first and second planar surfaces 402, 403 are connected by a peripheral edge 408 defining a thickness T (FIG. 11) of the body 401.

In some implementations, the body 401 of the strain-relief bracket 400 has a thickness T of less than about 0.5 inches (about 13 mm). In certain implementations, the body 401 of the strain-relief bracket 400 has a thickness T of less than about 0.2 inches (about 5 mm). In one example implementation, the body 401 of the strain-relief bracket 400 has a thickness T of about $1/8^{th}$ of an inch (about 3 mm). In some implementations, the body 401 of the strain-relief bracket 400 has a length L that is between about two inches (about 51 mm) and about six inches (about 152 mm).

In certain implementations, the bracket body 401 also includes at least one handle to assist a user in manipulating the bracket body 401. In some implementations, the body 401 includes a first handle 417 at the first end 404 and a second handle 417 at the second end 405. The handles 417 each provide a grasping surface at which a user may hold the bracket body 401 when positioning the bracket body 401 at the strain-relief location 230. In other implementations, a handle may be positioned at a central location on the body 401.

The planar surfaces 402, 403 of the bracket body 401 also extend from a first side 406 to a second side 407. In some implementations, the first and second handles 417 extend towards the second side 407 of the body 401 to define a first bracket width W1. In certain implementations, the width W1 of the bracket body 401 at the handles 417 is less than about one inch (about 25 mm). In one implementation, the width W1 of the bracket body 401 is about $2/3^{rd}$ of an inch (about 17 mm).

In general, the body 401 of the bracket 400 is configured to mount within the enclosure at the ledge 242. For example, in some implementations, the second planar surface 403 of the body 401 may face the planar surface 244 of the ledge 242. In certain implementations, the second planar surface 403 of the bracket body 401 is configured to seat on the planar surface 244 of the ledge 242. In some implementations, the ledge 242 supports the bracket body 401.

The bracket body 401 defines one or more open-ended channels 410 extending between the first and second planar surfaces 402, 403. The open end 411 of each channel 410 faces the second side 407 of the body 401. In certain implementations, the inner profile of each channel 410 is generally squared off (see FIG. 10). In other implementations, the inner profile of each channel 410 may be round, obround, elliptical, or another shape.

Each of the channels 410 has a width W3 that is sufficiently narrow to inhibit a body 341 of a fiber optic connector 340 from passing through the channel 410. In some implementations, the width W3 of each channel 410 is less than a width W4 of the body 341 of a fiber optic connector 340. In certain implementations, the width W3 of each channel 410 is less than about $1/4^{th}$ of an inch (about 6.4 mm). In certain implementations, the width W3 of each channel 410 is less than about 0.22 inches (about 5.5 mm).

The width W3 of each channel 410 is sufficiently large to enable a boot 345 to be received within the channel 410. In some implementations, the width W3 of each channel 410 is sufficiently large to surround the boot 345 without applying pressure to the boot 345. In other implementations, the width W3 of the channels 410 is sized to partially apply an inward pressure on the boot 345 to aid in holding the connector 340 in place. In certain implementations, the width W3 of the channels 410 is sized to inwardly deform the boot 345 when the boot 345 is received at the channel 410.

For example, in some implementations, the width W3 of each channel 410 is greater than about 0.125 of an inch (about 3.2 mm). Indeed, in some implementations, the width W3 of each channel 410 is greater than about 0.16 inches (about 4 mm). In one implementation, the width W3 of each channel 410 is about 0.2 inches (about 5 mm). In another implementation, the width W3 of each channel 410 is about 0.19 inches (4.8 mm).

Support ledges 412 at least partially bound the open-ended channels 410. The support ledges extend generally transverse to the insertion axes of the first ports 222 of the optical adapters 221. In certain implementations, the support ledges 412 are generally U-shaped. The support ledges 412 extend from the first side 406 of the bracket body 401 towards the second side 407 to define a second width W2. In some implementations, the second width W2 is less than the first width W1 of the body 401 at the handles 417. In some implementations, the width W2 is less than about ½ an inch (about 13 mm). In one implementation, the width W2 is about 0.47 inches (about 12 mm). In other implementations, however, the support ledges 412 may have the same width as the handles 417.

In some implementations, an alignment tab 415 is formed at an intermediate location along the length L of the bracket body 401. For example, the alignment tab 415 may be located at a center of the bracket body 401. In certain implementations, three of the open-ended channels 410 are located on either side of the alignment tab 415. The alignment tab 415 extends towards the first side of the body 406. In some implementations, the alignment bracket 415 is about the same width as the channels 410. In other implementations, however, the alignment bracket 415 may be larger or smaller than the alignment channels 410.

In some implementations, the bracket body 401 defines one or more notches 418 that aid in aligning and/or retaining the bracket body 401 within the enclosure 200. The notches 418 have open ends 419 facing the first side 406 of the bracket body 401. In certain implementations, the notches 418 extend at least partially between the open-ended channels 410. For example, the notches 418 may be cut into the support ledges 412 and handles 417 of the bracket body 401. In the example shown, the notches 418 are narrower than the open-ended channels 410.

Figure 12:
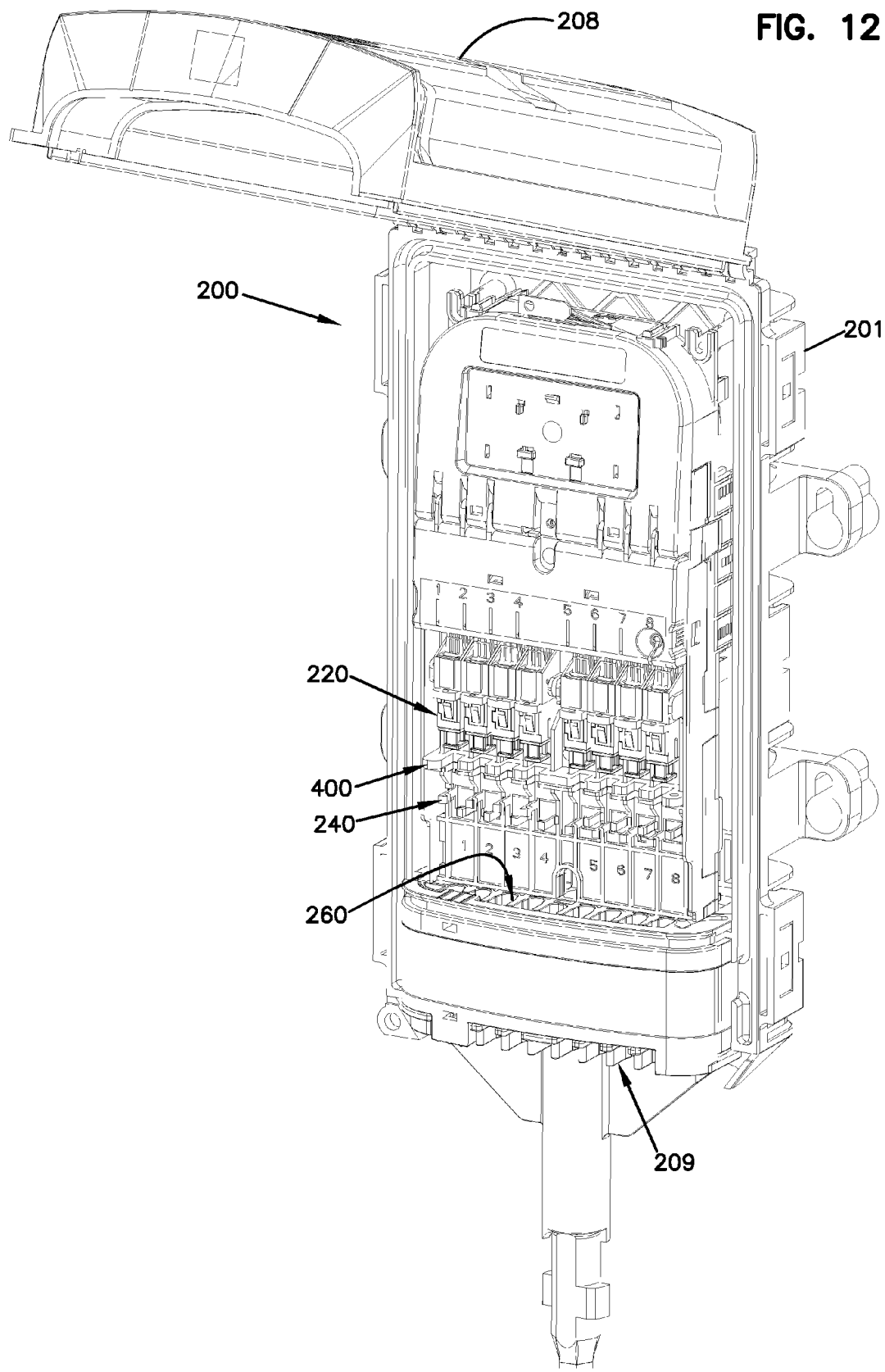
FIG. 12 is a perspective view of the fiber optic enclosure of FIG. 3 with the strain relief bracket of FIGS. 7-11 positioned thereat.
Figure 13:
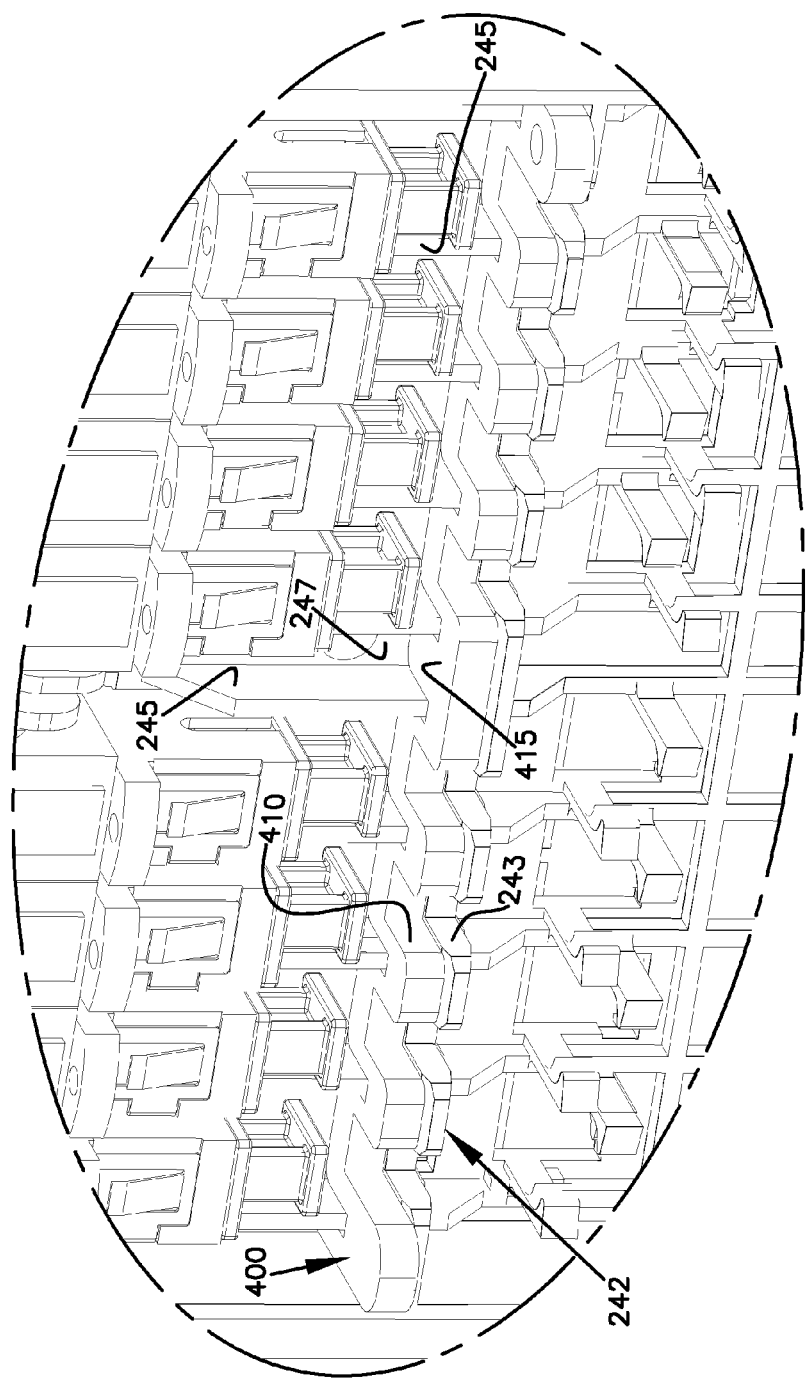
FIG. 13 is an enlarged view of a portion of FIG. 12.

As shown in FIGS. 12-13, the strain-relief bracket 400 may be positioned at the ledge 242 within the enclosure 200. For example, a user may position the bracket so that the second planar surface 403 faces the ledge 242 and the notches 418 align with the ribs 245. In some implementations, the second planar surface 403 of the bracket body 401 seats on the ledge 242 to hold the bracket body 401 at the strain-relief location 230.

The bracket body 401 is oriented so that the notches 418 face towards the base 201 of the enclosure 200 and the open ends 411 of the channels 410 face away from the base 201 of the enclosure 200. In certain implementations, the notches 418 fit snugly about the ribs 245 to facilitate retaining the bracket body 401 at the strain-relief location 230. For example, the notches 418 may be sized and shaped to form a friction-fit about the ribs 245 of the enclosure 200. In other implementations, however, the notches 418 fit loosely about the ribs 245.

In the example shown, the optical adapters 221 are separated into a first group located at a right side of the enclosure 200 and a second group located at a left side of the enclosure 200. The first and second groups are separated by a channel 247. In certain implementations, ribs 245 run vertically along either side of the channel 247. In some implementations, the alignment tab 415 of the bracket body 401 fits within the channel 247 when the bracket body 401 is positioned at the ledge 242.

Figure 14:
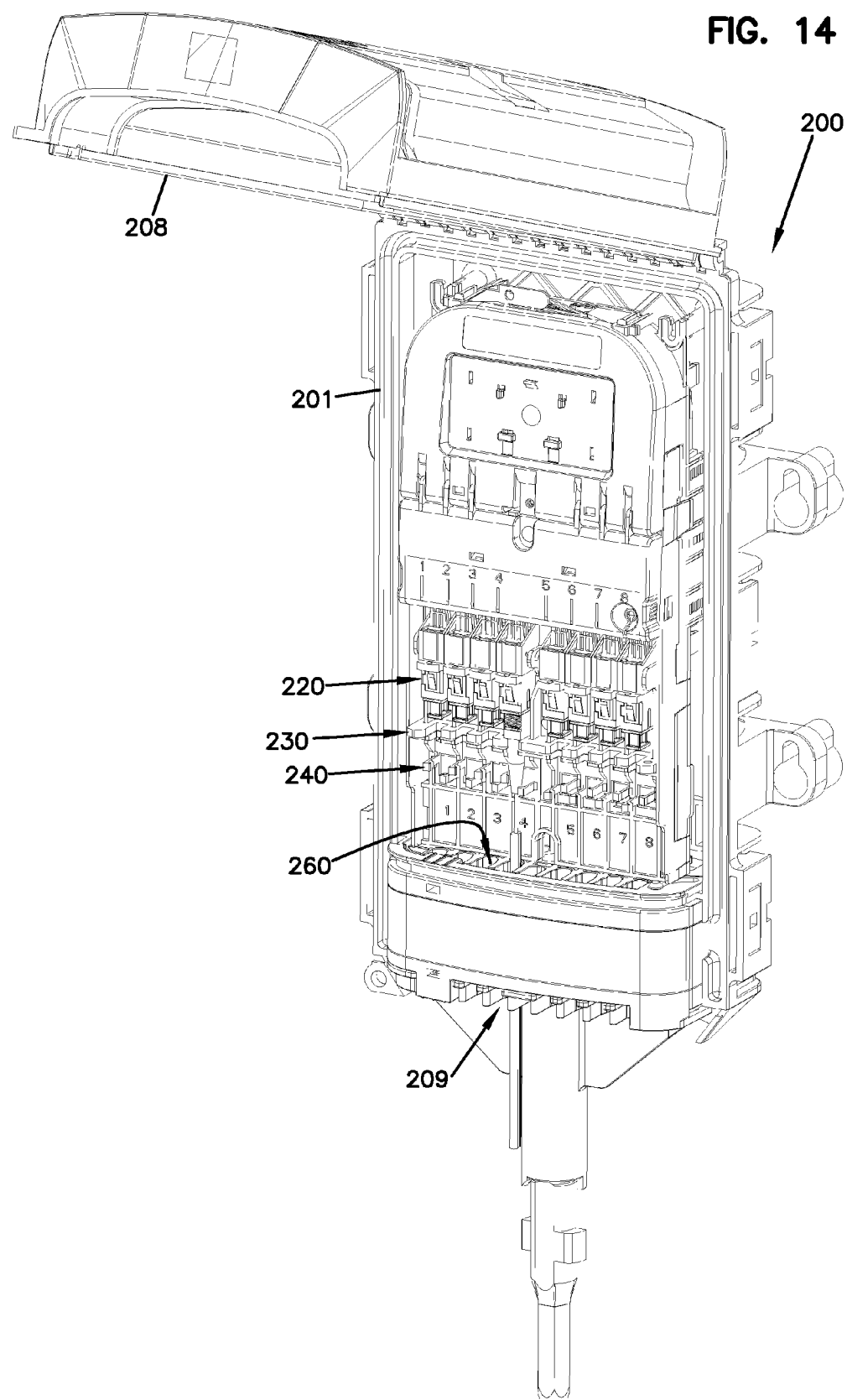
FIG. 14 is a perspective view of the fiber optic enclosure of FIG. 12 with a connectorized optical fiber plugged into one of the optical adapters and being managed by the strain-relief bracket.
Figure 15:
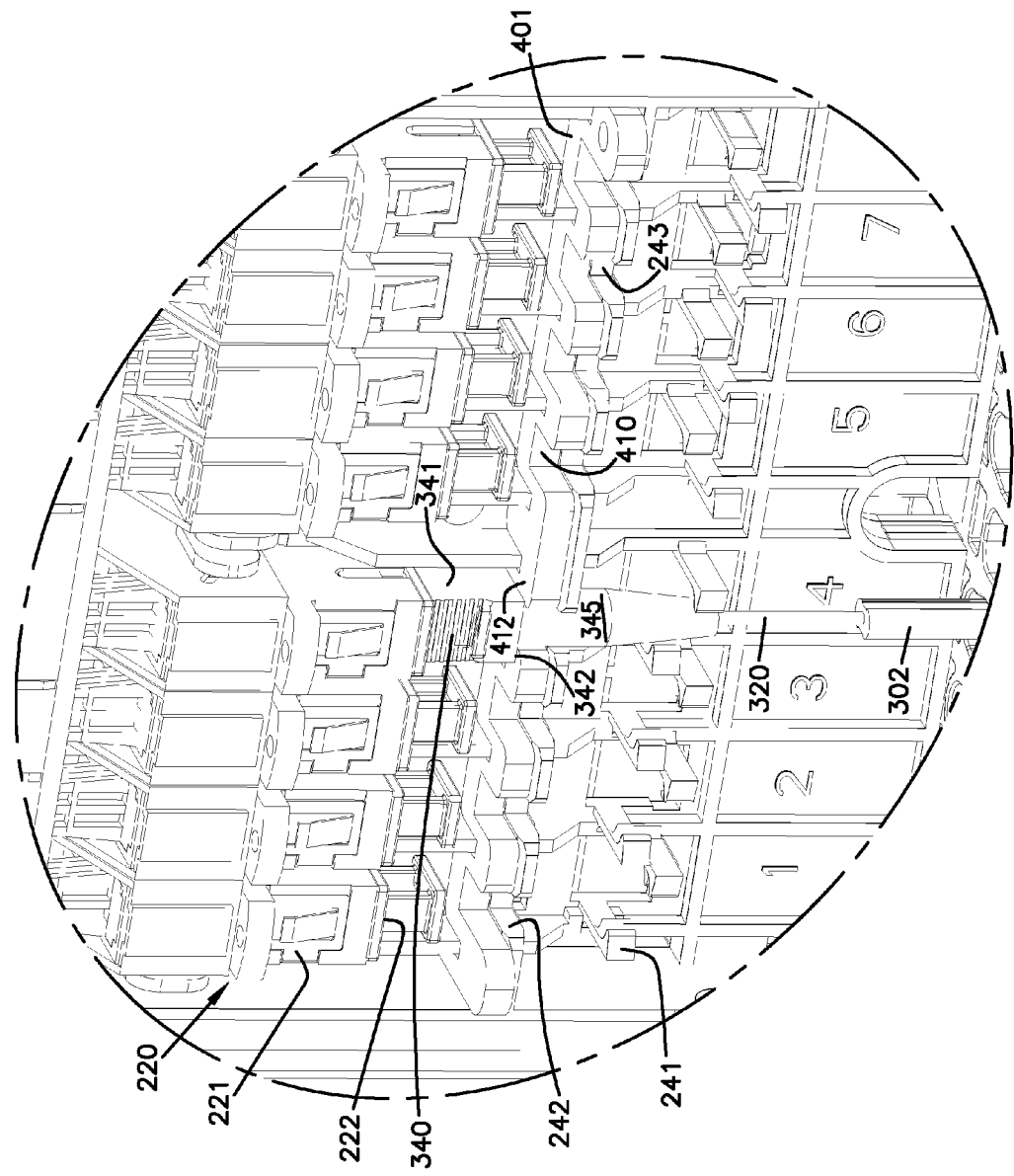
FIG. 15 is an enlarged view of a portion of FIG. 14.
Figure 16:
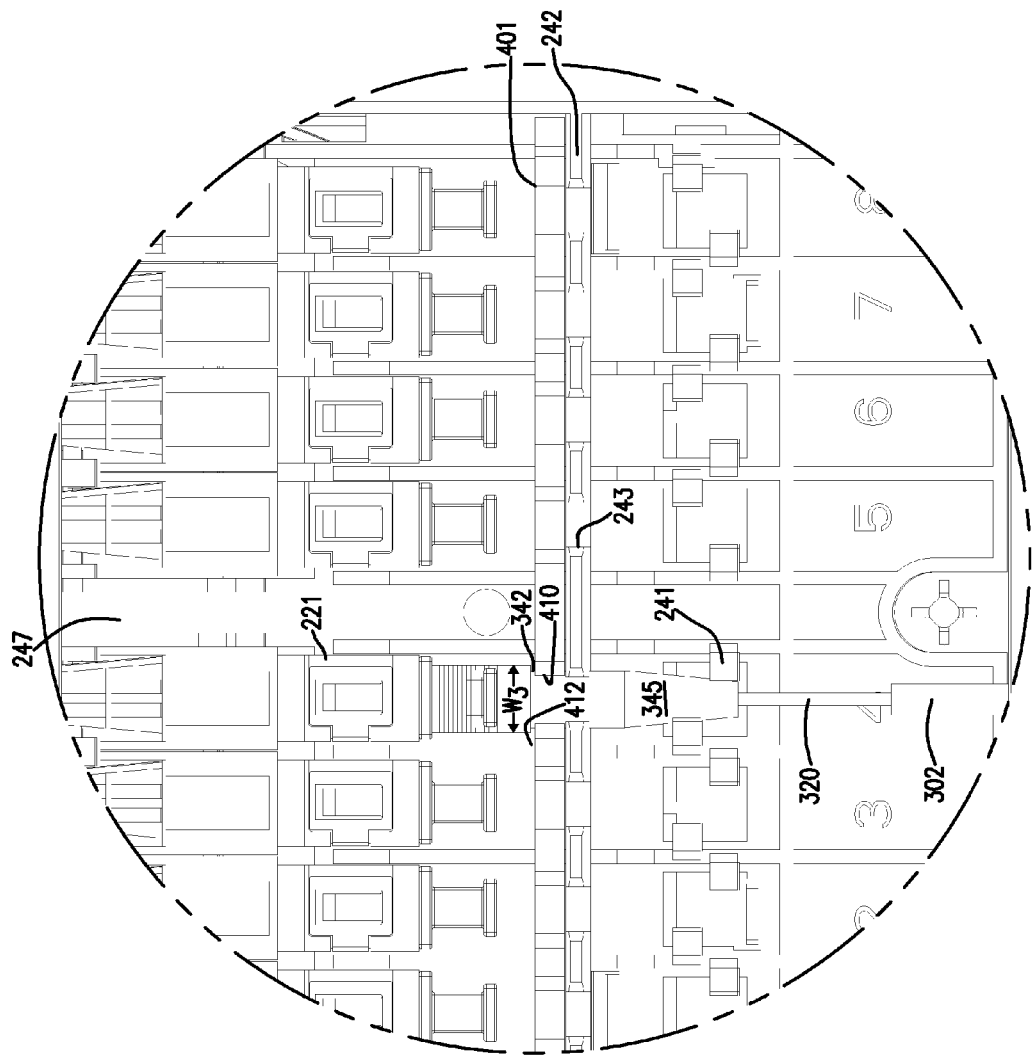
FIG. 16 is an enlarged view of a portion of FIG. 14 shown in a front elevational view.

As shown in FIGS. 14-16, the bracket 400 provides strain-relief to one or more connectors 340 plugged into the first ports 222 of the optical adapters 221. In general, at least a portion of a body 341 of each fiber optic connector 340 has a width W3 that is larger than a width W4 of the channels 410 of the bracket body 401. Accordingly, outer sides of an end surface 342 of each connector body 341 face one of the support ledges 412 of the bracket body 401 when the fiber optic connector 340 is plugged into the first port 222 of one of the optical adapters 221.

When a sufficient axial pulling force is applied to the cable 300, the end surface 342 of the connector body 341 may be forced against the support ledges 412 of the bracket body 401. Accordingly, the support ledge 412 will inhibit the connector body 341 from being pulled out of engagement with the optical adapter 221. In some implementations, the bracket 401 is positioned within the enclosure 200 and has a thickness T such that the end surface 342 of each connector body 341 seats on or otherwise engages the respective support ledge 412 even when a pulling force is not applied to the cable 300.

In other implementations, the end surface 342 of each connector body 341 is spaced a short axial distance from the support ledge 412 so as to allows limited axial movement of the fiber optic connectors 340 relative to the optical adapters 221. In some implementations, the axial distance is less than about 0.2 inches (5.1 mm). In certain implementations, the axial distance is less than about 0.1 inches (2.5 mm). In certain implementations, the axial distance is less than about 0.08 inches (2 mm). In certain implementations, the axial distance is less than about 0.04 inches (1 mm). In one example implementation, the axial distance is about 0.008 inches (0.2 mm).

In some implementations, a fiber optic connector 340 may be inserted into and/or removed from one of the optical connectors 221 after the strain-relief bracket 400 has been positioned within the enclosure 200. For example, one or more of the optical adapters 221 may be pivoted or rotated so that the first ports 222 face away from the bracket body 401. When the optical adapter 221 is pivoted, the first port 222 is faced away from the bracket body 401. Accordingly, a connector body 341 may be freely inserted into or removed from the first port 222. After inserting a connector body 341 into the port 222, the optical adapter 221 may be pivoted back into position. Pivoting the optical adapter 221 back to the initial position moves the boot 345 of the connector 340 into the respective bracket channel 410 and the connector body 341 into position above the support ledge 412.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:
1. A strain-relief bracket comprising:
 a monolithic body having first and second planar surfaces extending along a length of the body from a first end to a second end and extending along a width of the body from a first side to a second side, the first and second planar surfaces being connected by a peripheral edge defining a thickness of the body;
 a plurality of notches extending between the first and second planar surfaces, an open end of each notch facing the first side of the body;
 a plurality of channels extending between the first and second planar surfaces, an open end of each channel facing the second side of the body;
 a plurality of support ledges at least partially bounding the open-ended channels;
 a first handle located at the first end of the body; and
 a second handle located at the second end of the body.
2. The strain-relief bracket of claim 1, wherein the thickness of the body is less than about one-half of an inch.

3. The strain-relief bracket of claim 2, wherein the thickness of the body is about ⅛th of an inch.

4. The strain-relief bracket of claim 1, wherein the length of the body is between about two inches and about six inches.

5. The strain-relief bracket of claim 1, wherein the width of the body is less than about one inch.

6. The strain-relief bracket of claim 1, wherein an alignment tab is formed at an intermediate location along the length of the body, the alignment tab extending towards the first side of the body.

7. The strain-relief bracket of claim 6, wherein three of the support ledges are located on either side of the alignment tab.

8. The strain-relief bracket of claim 1, wherein the support ledges are generally U-shaped.

9. The strain-relief bracket of claim 8, wherein the notches are narrower than the channels.

10. The strain-relief bracket of claim 1, wherein the first and second handles extend farther towards the second side of the body than the support ledges.

11. A fiber optic closure comprising:
an enclosure defining an interior and at least one cable port leading to the interior;
at least a first optical adapter located within the enclosure, the first optical adapter having a first port facing the cable port of the enclosure and a second port facing away from the cable port, each of the first and second ports of the first optical adapter being sized and configured to receive a fiber optic connector;
a ledge located within the enclosure between the first optical adapter and the cable port, the ledge defining a generally planar surface facing the first optical adapter, the ledge also defining a first channel that aligns with the first port of the first optical adapter; and
a strain-relief bracket located within the enclosure at the ledge, the strain-relief bracket having a first planar surface that faces the planar surface of the ledge, the strain-relief bracket also defining at least a first channel that aligns with the first channel of the ledge, the first channel of the strain-relief bracket having a width that is less than a width of a fiber optic connector to provide a support ledge that faces the first port of the first optical adapter.

12. The fiber optic closure of claim 11, further comprising at least a first optical fiber extending into the interior of the enclosure through the cable port, the first optic fiber being terminated at a first fiber optic connector that is plugged into the first port of the first optical adapter, the first optical fiber passing through the first channel defined in the strain-relief bracket and the first channel defined in the ledge.

13. The fiber optic closure of claim 12, further comprising a gasket located within the enclosure at the cable port to seal the interior of the enclosure from an exterior of the enclosure, the first optical cable extending through the gasket.

14. The fiber optic closure of claim 13, wherein a section of the first optical fiber that extends out of the enclosure from the cable port is surrounded by a ruggedized jacket.

15. The fiber optic closure of claim 11, wherein a plurality of optical adapters are located within the enclosure, each of the optical adapters including a first port and a second port, the plurality of optical adapters including the first optical adapter, wherein a plurality of optical fibers extend into the interior of the enclosure through the cable port, each optical fiber being terminated at a fiber optic connector that is plugged into the first port of one of the optical adapters, the plurality of optical fibers including the first optical fiber; wherein the ledge defines a first plurality of channels that align with the first ports of the optical adapters, the first plurality of channels including the first channel of the ledge; and wherein the strain-relief bracket defines a second plurality of channels that align with the first plurality of channels, the second plurality of channels including the first channel of the strain-relief bracket.

16. The fiber optic closure of claim 15, wherein the optical adapters are coupled to a panel, and wherein ribs extend from the panel between the optical adapters, wherein the strain-relief bracket defines a plurality of notches that fit over the ribs when the strain-relief device is positioned at the ledge within the enclosure.

17. The fiber optic closure of claim 16, wherein the optical adapters are separated into a first group and a second group, the first group being spaced from the second group, and wherein the strain-relief bracket includes an alignment tab that extends towards the panel in between the first and second groups.

18. The fiber optic closure of claim 16, wherein the optical adapters pivot away from the panel to enable the fiber optic connectors to be removed from the optical adapters.

19. The fiber optic closure of claim 11, wherein the width of the first channel of the strain-relief bracket is about equal to a width of the first channel of the ledge.

20. The fiber optic closure of claim 11, wherein the strain-relief device is fastened to the ledge.

21. A fiber optic closure comprising:
an enclosure defining an interior and at least one cable port leading to the interior;
at least a first optical adapter located within the enclosure, the first optical adapter having a first port facing the cable port of the enclosure and a second port facing away from the cable port, each of the first and second ports of the first optical adapter being sized and configured to receive a fiber optic connector;
a ledge located within the enclosure between the first optical adapter and the cable port, the ledge defining a support surface facing the first optical adapter, the ledge also defining a first channel that aligns with the first port of the first optical adapter; and
a strain-relief bracket located within the enclosure at the ledge, the strain-relief bracket having a first surface that faces the support surface of the ledge, the strain-relief bracket also defining at least a first channel that aligns with the first channel of the ledge, the first channel of the strain-relief bracket having a width that is less than a width of a fiber optic connector to provide a support ledge that faces the first port of the first optical adapter.

22. The fiber optic closure of claim 21, wherein an optical connector is received at the first optical adapter, wherein a portion of the optical connector seats on the strain-relief bracket, and wherein a thickness of the strain-relief bracket is at least as great as a distance over which the portion of the optical connector travels to remove the optical connector from the first port of the first optical adapter.

23. The fiber optic closure of claim 22, wherein the optical connector includes an SC-connector.

24. The fiber optic closure of claim 23, a grip sleeve of an SC-connector seats on the first surface of the strain-relief bracket when the SC-connector is received at the first port of the first optical adapter.

* * * * *